United States Patent
Sakamoto et al.

[11] Patent Number: 6,122,468
[45] Date of Patent: Sep. 19, 2000

[54] METHOD AND APPARATUS FOR FORMING TONER IMAGES

[75] Inventors: Koji Sakamoto, Tokyo; Akio Kosuge, Kanagawa, both of Japan

[73] Assignee: Ricoh Company, Ltd., Tokyo, Japan

[21] Appl. No.: 09/415,914

[22] Filed: Oct. 12, 1999

[30] Foreign Application Priority Data

| Oct. 9, 1998 | [JP] | Japan | 10-287848 |
| Oct. 13, 1998 | [JP] | Japan | 10-290219 |

[51] Int. Cl.$^7$ .................................................. G03G 15/01
[52] U.S. Cl. .......................... 399/223; 347/119; 399/302; 430/97
[58] Field of Search .................. 399/50, 51, 138, 399/222, 223, 298, 302; 430/97; 252/62.59; 428/403; 347/119, 140

[56] References Cited

U.S. PATENT DOCUMENTS

| 4,406,535 | 9/1983 | Sakamoto et al. | 399/274 |
| 4,561,381 | 12/1985 | Kaneko et al. | 399/270 |
| 4,640,129 | 2/1987 | Miyakawa et al. | 399/63 |
| 4,896,625 | 1/1990 | Sakamoto et al. | 399/267 |
| 4,899,689 | 2/1990 | Takeda et al. | 399/286 |
| 4,992,191 | 2/1991 | Mori et al. | 252/62.59 |
| 5,223,668 | 6/1993 | Takaya et al. | 399/236 |
| 5,289,243 | 2/1994 | Sakamoto | 399/119 |
| 5,313,233 | 5/1994 | Nagase et al. | 347/119 X |
| 5,499,079 | 3/1996 | Kinoshita et al. | 399/50 X |
| 5,599,627 | 2/1997 | Aoki et al. | 428/403 |
| 5,655,185 | 8/1997 | Hori et al. | 399/138 |
| 5,671,465 | 9/1997 | Kimura et al. | 399/119 |
| 5,950,039 | 9/1999 | Kawai et al. | 399/51 X |
| 6,013,403 | 1/2000 | Ichikawa | 430/97 |

FOREIGN PATENT DOCUMENTS

| 7-146589 | 6/1995 | Japan . |
| 8-30063 | 2/1996 | Japan | 399/223 |
| 9-54472 | 2/1997 | Japan . |
| 10-39586 | 2/1998 | Japan . |
| 10-83120 | 3/1998 | Japan . |
| 10-138566 | 5/1998 | Japan . |

*Primary Examiner*—Fred L. Braun
*Attorney, Agent, or Firm*—Oblon, Spivak, McClelland, Maier & Neustadt, P.C.

[57] ABSTRACT

In an electrophotographic image forming apparatus, a photoconductive element includes a photoconductive film having a thickness of 15 μm or below. A light beam having a diameter of 50 μm or below optically forms a latent image on the photoconductive element. Toner is caused to deposit on a dot image in an amount 1.2 times greater than on an area image. This is successful to minimize the variation of image quality and to render dots inconspicuous. The method of forming toner images is also included.

27 Claims, 12 Drawing Sheets

FIG. 4

| DEVELOPING SYSTEM | CHARGE ON TONER (μc/gr) | TONER ON DEVELOPING SLEEVE (mg/cm²) | TONER ON SOLID PORTION (mg/cm²) | TONER ON DOT (mg/cm²) | FATTENING |
|---|---|---|---|---|---|
| 2-INGREDIENT MAGNET BRUSH | 12 | — | 0.58 | 0.88 | × |
| 2-INGREDIENT MAGNET BRUSH | 16 | — | 0.54 | 0.76 | △ |
| 2-INGREDIENT MAGNET BRUSH | 21 | — | 0.57 | 0.65 | ○ |
| 2-INGREDIENT MAGNET BRUSH | 29 | — | 0.55 | 0.54 | ◎ |
| NONCONTACT 1-INGREDIENT (MAGNETIC) | 10 | 0.87 | 0.84 | 0.99 | ○ |
| CONTACT 1-INGREDIENT (NON-MAGNETIC) | 14 | 0.53 | 0.54 | 0.51 | ◎ |

METHOD AND APPARATUS FOR FORMING TONER IMAGES

BACKGROUND OF THE INVENTION

The present invention relates to an electrophotographic image forming apparatus and more particularly to a full-color digital copier, full-color printer or similar full-color image forming apparatus.

It is a common practice with a digital copier, printer or similar image forming apparatus to expose the surface of a photoconductive element in the form of dots in accordance with image data. A light source for the exposure is implemented by an LD (Laser Diode) or an LED (Light Emitting Diode) array. Usually, the apparatus forms a latent image representative of a high density image portion by selectively turning on or turning off a light beam intense enough to sufficiently attenuate the potential of the photoconductive element (saturation writing hereinafter). Also, the apparatus renders a halftone portion or a highlight portion by modulating the intensity or the duration of the light beam. Usually, to render sufficient tonality and to reproduce a highlight portion, the intensity and duration of the light beam for a single dot are made sufficiently small in order to form a latent image having a medium potential (one dot, multilevel process hereinafter). However, in electrophotography relying mainly on static electricity, the characteristic of a photoconductive element and that of a developer vary due to varying environmental conditions and aging. The problem with the one dot, multilevel process is that image quality centering around the halftone portion is susceptible to the characteristic of the photoconductive element and that of the developer.

There has been known an image forming process of the type effecting the saturation writing with all of a high density portion, a halftone portion and a highlight portion, and rendering tonality on the basis of the density of dots for a unit area (bi level process hereinafter). Basically, the bi level process does not use a medium potential portion and therefore causes a minimum of change to occur in image quality. However, dots, or unit images, output by the bilevel process are conspicuous in an image and render the image rough.

Conventional methods available for outputting high quality images, particularly halftone images, with the above image forming apparatus will be described specifically. Today, a density tonality system is extensively used which uses a recording density of 400 dpi (dots per inch) and assigns eight bits of data to each dot. The density tonality system combines PWM (Pulse Width Modulation) and PM (Power Modulation) for effecting 256-tone multi level exposure. By this exposure, a latent image having an analog medium potential is formed. The amount of toner to deposit in a unit area is varied to render tonality. This kind of scheme, also using a medium potential, is susceptible to the variation of photoconductive element and developer ascribable to environmental conditions and aging and renders a highlight portion, among others, unstable. Moreover, assigning eight bits of tonality data to each dot increases the amount of data and therefore increases the cost in relation to the increasing operation speed and recording density.

An area tonality system is another system available for rendering tonality and includes a dither method and an error scattering method by way of example. The area tonality system reduces the amount of data for a single dot, compared to the density tonality system. In addition, the area tonality system is little susceptible to the variation of the photoconductive element and developer because it does not use a medium potential. However, with the current recording density of 400 dpi, this system can implement only rough images. Stated another way, this system can stably realize high image quality if the recording density and therefore resolution is improved and if a latent image can be faithfully reproduced. This, however, cannot be done unless a latent image with a high resolution is formed by increasing the recording density and unless a developing step and an image transferring step are effected with a minimum of noise for faithful reproduction.

To achieve high image quality with an image forming apparatus of the type forming a latent image in the form of dots on a photoconductive element, Japanese Laid-Open Patent Publication No. 10-39586, for example, discusses a relation between an exposing length measured on a photoconductive element and a resolution. This document, however, relies on a highly sensitive photoconductive element which is expensive. In addition, the sensitivity of this kind of photoconductive element is apt to decrease even when the element is exposed to room light during replacement or jam processing, so that the element must be handled with the greatest possible care.

We proposed in Japanese Patent Laid-Open Publication No. 10-138566 to set up an adequate relation between the sensitivity of a photoconductive element and the duration of exposure for outputting a stable, high quality image. The adequate relation is achievable not only with a highly sensitive photoconductive element but also with a photoconductive element of ordinary sensitivity.

While the above conventional technologies are capable of improving the stability of a dot image to a noticeable degree, they give no consideration to the particle size, tinting strength and other properties of toner. Even if a latent image is formed with a high resolution, toner having a great particle size cannot faithfully reproduce the latent image and renders the resulting image rough. Further, if the tinting strength of toner is short and needs a great amount of toner to implement required image density, the toner is apt to scatter during, e.g., image transfer and degrade the resulting image. This is particularly true with a full-color image forming apparatus which sequentially transfers toner images of different colors one upon the other.

As for a high quality full-color image, Japanese Patent Laid-Open Publication No. 7-146589, for example, shows a relation between the particle size distribution of toner and the image density measured after fixation with respect to toner deposited on a recording medium in an amount of 0.5 mg/cm$^2$. Japanese Patent Laid-Open Publication 9-54472 teaches that a full-color image with desirable color balance and color reproducibility is attained when the amounts of deposition of yellow toner, magenta toner and cyan toner each are 0.5 mg/cm$^2$ to 0.7 mg/cm$^2$ while the amount of deposition of black toner is 0.7 mg/cm$^2$ to 1.0 mg/cm$^2$.

A photoconductive element has its electrostatic characteristic deteriorated little by little due to repeated charging and exposure. It is therefore necessary to minimize the deterioration of the electrostatic characteristic by lowering a charge potential as far as possible. This is because the strength of an electric field acting on a photoconductive layer increases with an increase in charge potential, aggravating the deterioration of the photoconductive layer. However, excessively low charge potentials would make potential contrast short and would thereby lower image density and bring about background contamination. Japanese Patent Laid-Open Publication No. 10-83120 described in detail an image forming method capable of outputting desirable images even when potential contrast is low, and a developer suitable for such a method.

A digital camera, for example, is a recent achievement derived in an information networking environment and has accelerated the development of a color printer adaptive to a network. At the present stage of development, however, a full-color printer is lower in printing speed, higher in cost including a running cost and greater in size than a black-and-white printer and is not as popular as a black-and-white printer.

SUMMARY OF THE INVENTION

It is therefore an object of the present invention to provide an image forming apparatus capable of forming an image with a minimum of change in image quality without rendering dots conspicuous.

It is another object of the present invention to provide a small size, low cost, high speed full-color image forming apparatus or similar image forming apparatus capable of stably preserving high image quality over a long period of time.

In accordance with the present invention, an image forming apparatus includes a photoconductive element including a photoconductive film having a thickness of 15 $\mu$m or below. An exposing device forms an electrostatic latent image in the form of dots on the photoconductive element by selectively turning on or turning off a light beam having a beam diameter of 50 $\mu$m or below in terms of a $1/e^2$ diameter and intense enough to sufficiently attenuate a potential deposited on the photoconductive element. A developing device develops the latent image with a dry developer to thereby form a corresponding toner image. Tonality is rendered on the basis of the density of dots for a unit area. The toner deposits on the dots in an amount 1.2 times greater than an amount to deposit on an area image for a given uniform density and a given unit area. The apparatus may be implemented as a copier.

Also, in accordance with the present invention, a copier includes an image reading device for reading a document, and an image forming apparatus for electrophotographically forming a color image read by the image reading device. The image forming apparatus includes a photoconductive element including a photoconductive film having a thickness of 15 $\mu$m or below. An exposing device forms, color by color, an electrostatic latent image in the form of dots on the photoconductive element by selectively turning on or turning off a light beam having a beam diameter of 50 $\mu$m or below in terms of the $1/e^2$ diameter and intense enough to sufficiently attenuate a potential deposited on the photoconductive element. A plurality of developing devices each develop a particular electrostatic latent image with a dry developer of particular to thereby produce a corresponding toner image. A transferring device transfers toner images of different colors produced by the developing devices to a recording medium one upon the other to thereby form a composite color image. Tonality is rendered on the basis of the density of the dots for a unit area. The toner deposits on the dots in an amount 1.2 times greater than an amount to deposit on an area image for a given uniform density and a given unit area.

BRIEF DESCRIPTION OF THE DRAWINGS

The above and other objects, features and advantages of the present invention will become more apparent from the following detailed description taken with the accompanying drawings in which:

FIG. 4 is a table listing the conditions of toner determined with various developing systems under various conditions;

In the drawings, identical reference numerals designate identical structural elements.

DESCRIPTION OF THE PREFERRED EMBODIMENTS

Preferred embodiments of the image forming apparatus in accordance with the present invention will be described hereinafter.

First Embodiment

Figure 1:
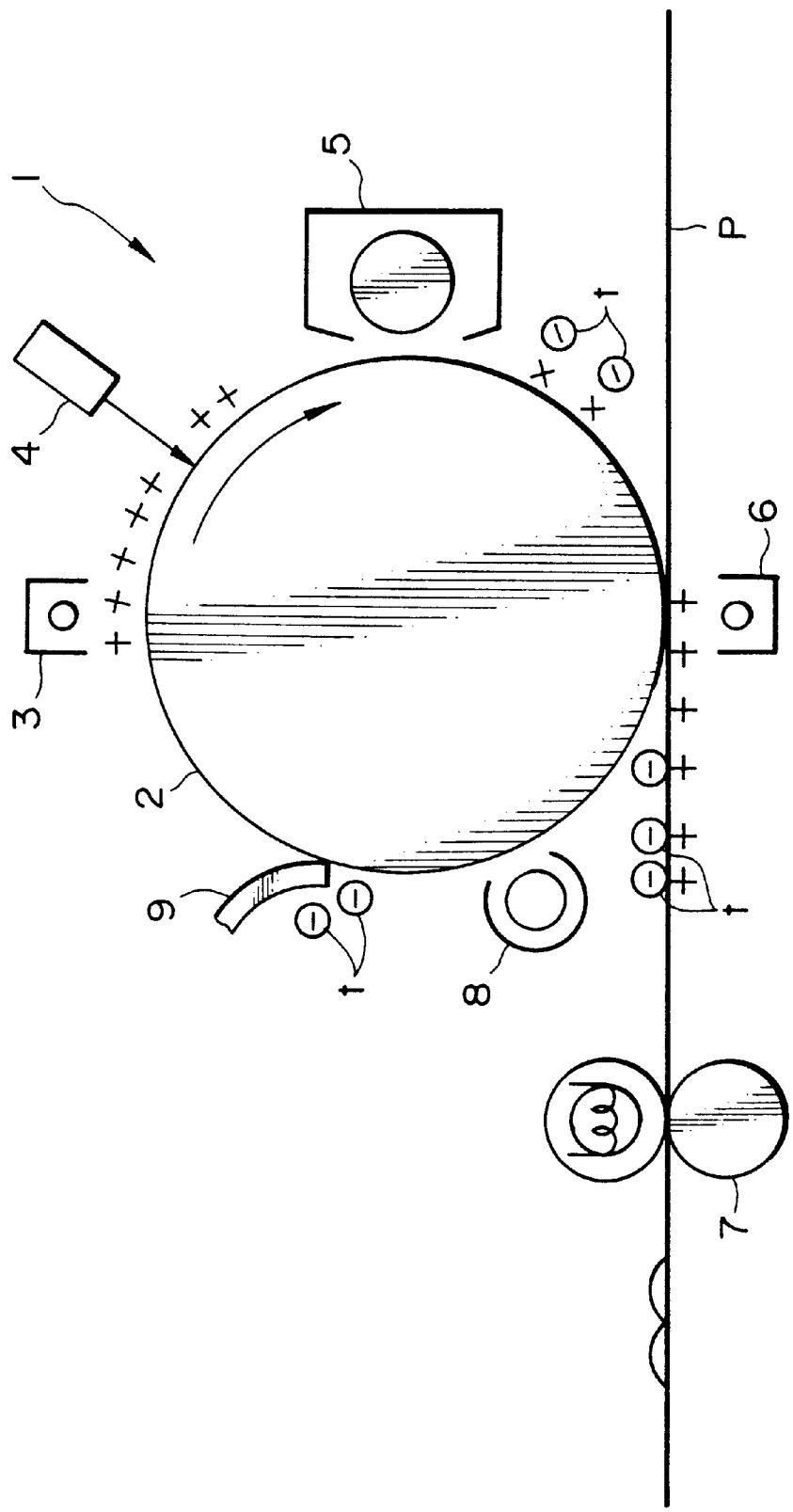
FIG. 1 is a vertical section showing an image forming apparatus applicable to a first to a third embodiment of the present invention.

Referring to FIG. 1 of the drawings, an electrophotographic image forming apparatus embodying the present invention is shown and generally designated by the reference numeral 1. As shown, the image forming apparatus 1 includes a photoconductive drum 2 which is a specific form of a photoconductive element. A charger 3 uniformly charges the surface of the drum 2. Optics 4 optically writes an electrostatic latent image on the charged surface of the drum 2. A developing unit 5 develops the latent image with toner t to thereby form a corresponding toner image. An image transfer unit 6 transfers the toner image from the drum 2 to a paper or similar recording medium P. A fixing unit 7 fixes the toner image on the paper P. A discharger 8 discharges the drum 2. A cleaning unit 9 removes the toner t left on the drum 2 after the image transfer.

In the illustrative embodiment, the optics 4 writes a latent image on the drum 2 with a light beam having a diameter of 50 $\mu$m or below in a density of 600 dpi. The drum 2 includes a photoconductive film having a thickness of 15 $\mu$m or below. More specifically, the optics 4 forms a latent image in the form of dots by selectively turning on or turning off the beam intense enough to sufficiently attenuate the potential of the drum 2. Tonality is rendered on the basis of the density of dots for a unit area. The developing unit 5 uses a dry developer.

The beam diameter of the optics 4 refers to, in a strict sense, a diameter lying in a range which implements a quantity of light necessary for attenuating the surface potential of the drum 2 to a so-called development start potential; this potential allows the toner t stored in the developing unit 5 to deposit on the drum 2. However, the beam diameter can roughly be defined by the generally used $1/e^2$ diameter for the following reasons.

Figure 2:
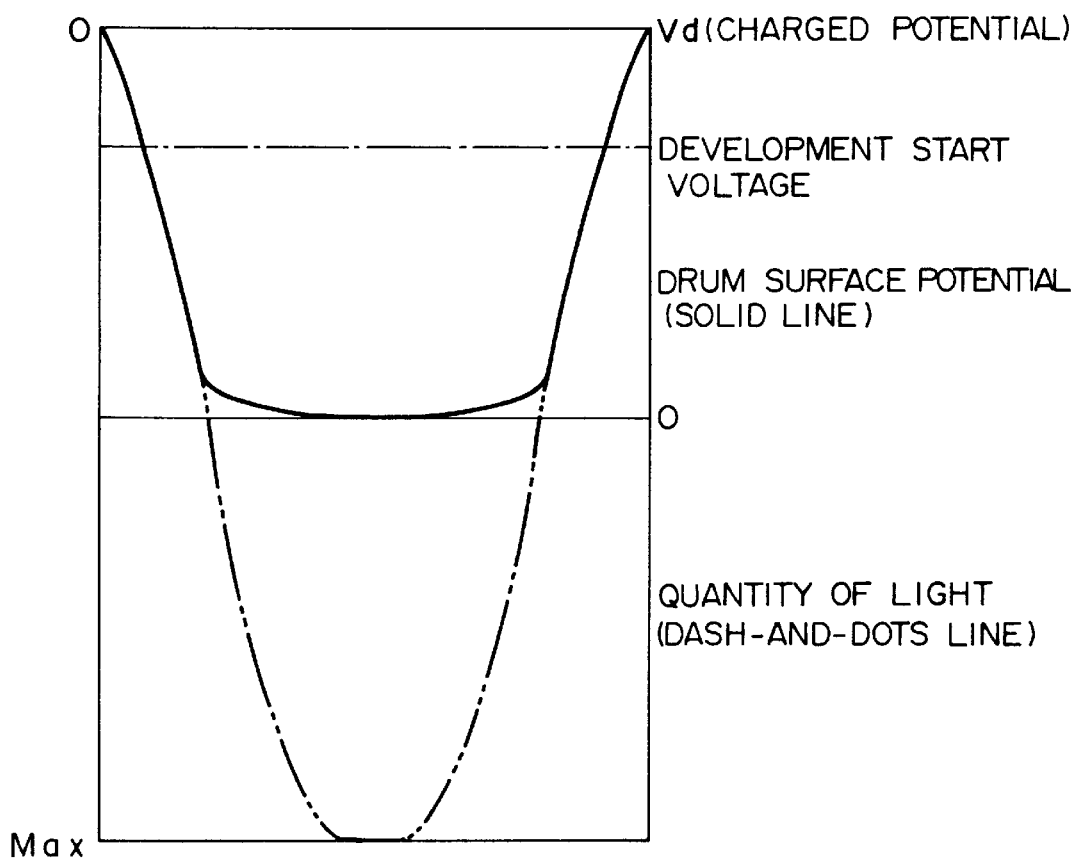
FIG. 2 is a graph showing a relation between the surface potential of a photoconductive element and the quantity of writing light particular to the apparatus.
Figure 3C:
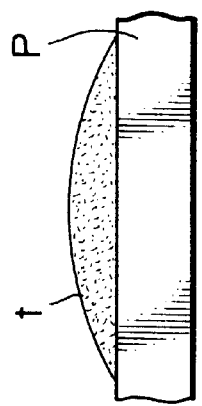
FIGS. 3A–3F are enlarged vertical sections each showing a particular condition in which toner is deposited on a paper or similar recording medium.
Figure 3B:
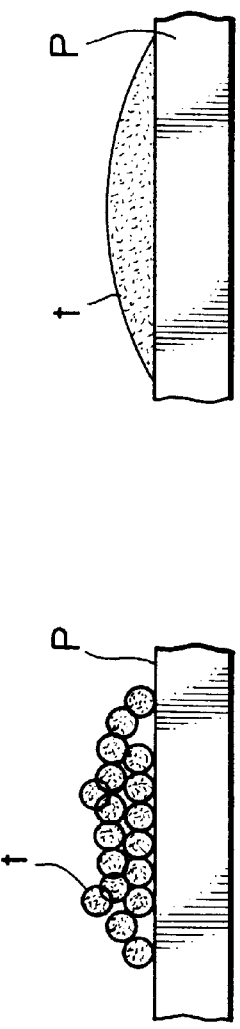
Figure 3A:
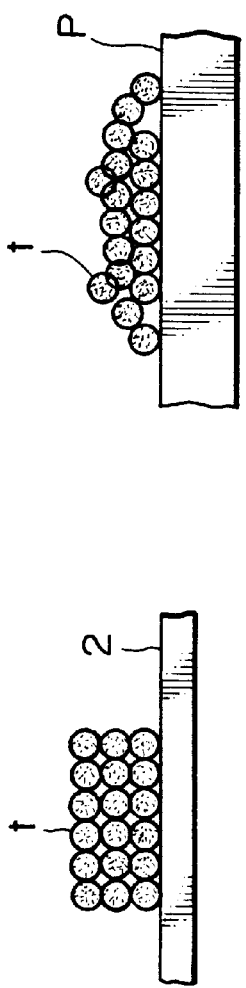
Figure 3F:
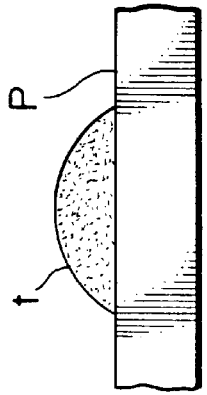
Figure 3E:
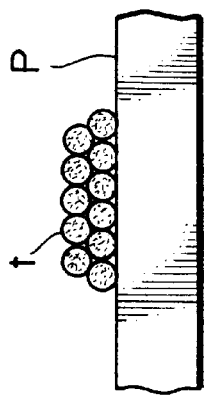
Figure 3D:
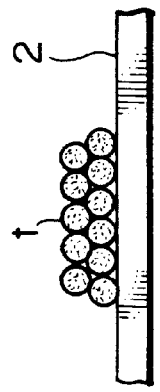

The above development start potential is adjusted by a bias potential in order to prevent toner t from depositing on the background of the drum 2. For example, if the charge potential is −450 V and if the potential after exposure is 0 V, it is a common practice to adjust the development start potential to about −300 V in a reversal development system. That is, the development start potential is generally considered to be about one-third of the contrast between the charge potential and the potential after exposure. On the other hand, in the previously mentioned bilevel process using saturation writing, the peak quantity of light should preferably be about two times greater than the quantity of light necessary for sufficiently attenuating the drum 2. It may therefore be said that a quantity of light corresponding to the development start voltage is about one-sixth of the peak quantity of light. This allows the $1/e^2$ diameter to be safely used (see FIG. 2). Of course, the peak quantity of light may be reduced to the quantity necessary for sufficiently attenuating the drum 2. In such a case, a dot diameter smaller than the $1/e^2$ diameter is achievable although slightly sacrificing the stability of development, so that a beam diameter of 50 $\mu$m or below in terms of the $1/e^2$ diameter suffices.

In the above condition, the bi level process can be implemented with a dot diameter of 50 $\mu$m or below. In practice, however, a dot diameter of 50 $\mu$m or below is not attainable in a printed image unless dots are prevented from fattening in the other conditions as far as possible. Toner for use in the ordinary dry process developing system has a particle size ranging from about 5 $\mu$m to about 10 $\mu$m. FIGS. 3A–3F each show a particular condition in which the toner t is deposited on the drum 2 or the paper P. The dot does not noticeably fatten (FIG. 3F) when the toner t is deposited on the drum 2 in an adequate amount (FIG. 3D), when the toner t is deposited on the paper P without scattering (FIG. 3E) or when the toner t is not crushed during fixation. However, the dot easily fattens by more than 10 $\mu$m (FIG. 3C) when the toner t is deposited on the drum 2 in an excessive amount (FIG. 3A), when the toner t is scattered on the paper P (FIG. 3B) or when the toner t is crushed during fixation.

We experimentally evaluated images under various conditions by using various developing systems. FIG. 4 tabulates the results of experiments. As FIG. 4 indicates, to provide an area image with a sufficient density without causing dots to fatten, it is necessary to confine, for a given uniform density and a given unit area, the amount of toner deposition on a dot image in a range less than about 1.2 times the amount of toner deposition on an area image.

Figure 5:
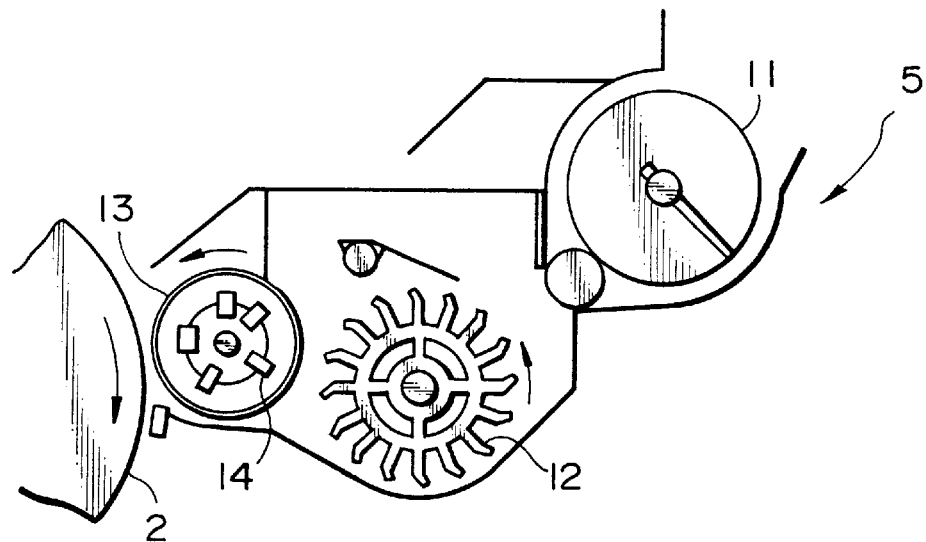
FIG. 5 is a vertical section showing a developing unit representative of the first embodiment of the present invention.
Figure 6:
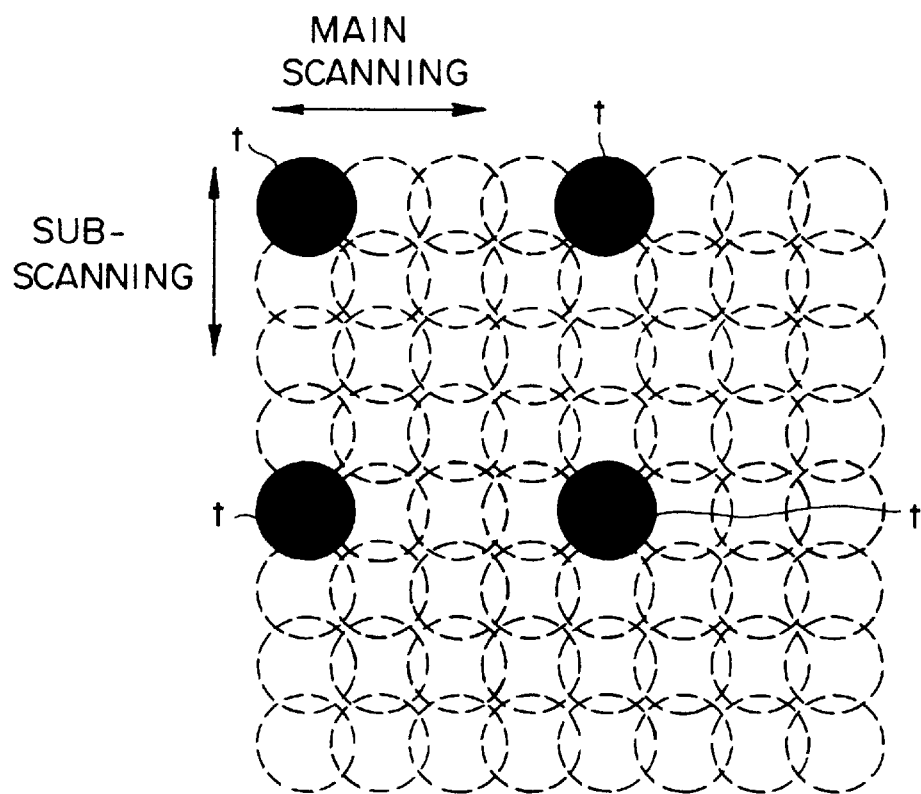
FIG. 6 is a plan view showing the definition of the amount of toner deposited on dots included in FIG. 4.

FIG. 5 shows the developing unit 5 in detail. In the illustrative embodiment, the developing unit 5 uses a two-ingredient type developer made up of a ferrite carrier and toner. As shown, the developing unit 5 includes a toner hopper 11, an agitator 12, a developing sleeve 13, and magnets 14. The composition of the toner and therefore the amount of charge to deposit on the toner was varied to measure the developing characteristic of the toner with respect to an area image and a single dot image. The results of measurement are also listed in FIG. 4 (2-ingredient Magnet Brush). To measure the amount of toner deposition on a single dot image, a pattern shown in FIG. 6 was prepared in which adjoining dots were spaced by three dots in the main and subscanning directions in order to prevent the dots from effecting each other. The amount of toner deposited on such a pattern for a unit area was measured and then multiplied by 16.

As FIG. 4 indicates, despite that a bias for development is so adjusted as to deposit the toner in a solid area in an amount of about 0.55 mg/cm$^2$, the amount of toner deposition on dots decreases with an increase in the charge of the toner. This presumably stems from the following situation. In a two-ingredient developing system, an electric field for developing a dot image mainly relies on an edge effect derived from the charge of a latent image and is therefore little susceptible to the bias for development. When such a dot image is developed by the toner carrying a great amount of charge, the charge of the latent image is sharply neutralized and suppresses development. As a result, the amount of toner deposition on dots decreases with an increase in the amount of charge of the toner. As shown in FIG. 4, when the amount of charge deposited on the toner is 21 $\mu$C/gr and 29 $\mu$C/gr, dots do not fatten (circles and double circles), and the area image has desirable density. It follows that if the amount of charge deposited on the toner in the two-ingredient developing system is about 20 $\mu$C/gr or above, it is possible to prevent dots from fattening while providing an area image with desirable density.

Second Embodiment

Figure 7:
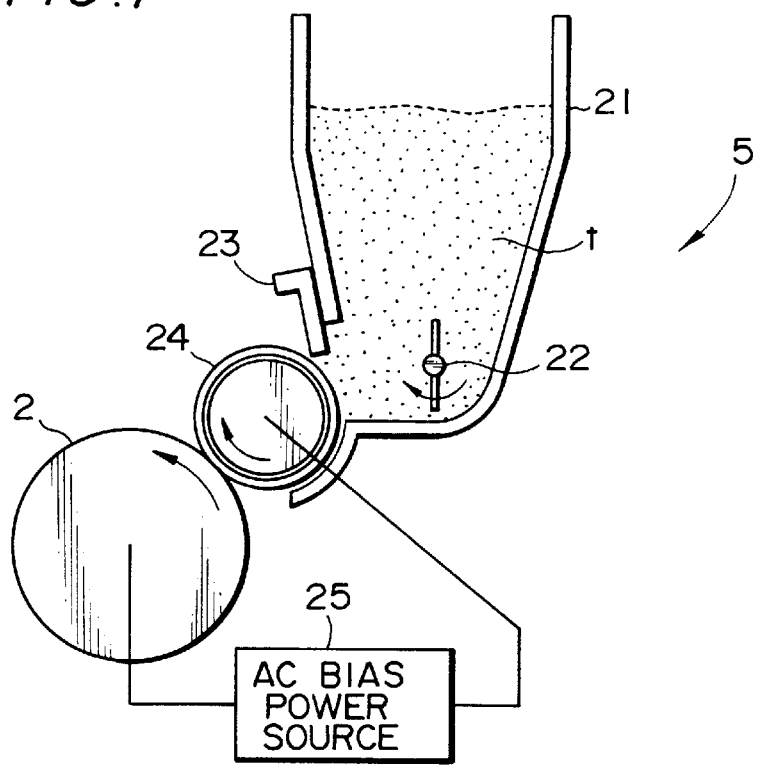
FIG. 7 is a vertical section showing the second embodiment of the present invention.

A second embodiment of the present invention will be described with reference to FIG. 7. This embodiment differs from the first embodiment mainly in the developing system of the developing unit 5. As shown, the developing unit 5 includes a hopper 21, an agitator 22, a doctor blade 23 and a developing sleeve 24 and use a noncontact, one-ingredient type developing system.

In the developing unit 5, magnetic toner t is fed to the surface of the developing sleeve 24 while being regulated by the doctor blade 23 to an amount implementing a density required of an area image. At this instant, the toner t is frictionally charged between the doctor blade 23 and the developing sleeve 24. Because the magnetic toner t had a specific gravity about 1.5 times greater than nonmagnetic toner, the amount (weight) of toner t to deposit on the developing sleeve 24 was set in such a manner as to deposit the toner t on a solid portion by 0.83 mg/cm$^2$. The toner t is transferred from the developing sleeve 24 to the drum 2 via a gap of about 0.2 mm. An AC bias power source 25 applies an AC bias for development between the developing sleeve 24 and the drum 2.

As also shown in FIG. 4 (Noncontact 1-Ingredient (Magnetic)), in the illustrative embodiment, substantially 100% of the toner t is transferred from the developing sleeve 24 to an area image. On the other hand, a dot image is developed by more than the amount of toner present on the developing sleeve 24 for a unit area despite the one-ingredient development using a thin toner layer. This is presumably because while the toner t moves back and forth in the above gap, the toner t around the portion of the developing sleeve 24 corresponding to a dot image is sequentially drawn toward the image by the AC bias.

As stated above, the illustrative embodiment uses one-ingredient development depositing the toner t on the developing sleeve 24 by an amount substantially equal to the amount required of an area image. This limits the amount of toner to be fed to the drum 2 and thereby prevents an excessive amount of toner to deposit on a dot image. Consequently, a dot of 50 µm or below can be stably formed.

Third Embodiment

Figure 8:
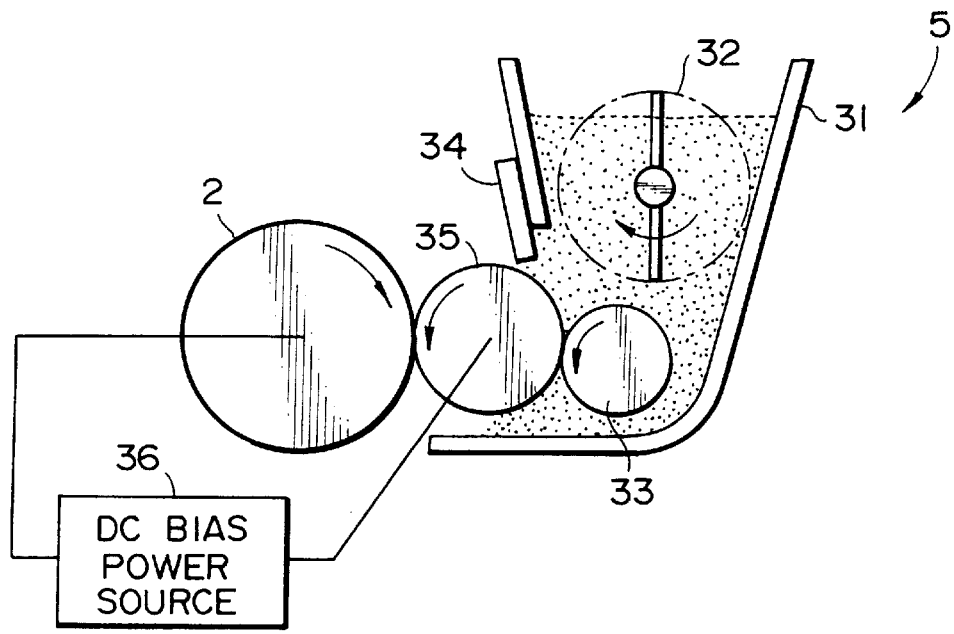
FIG. 8 is a vertical section showing the third embodiment of the present invention.

A third embodiment of the present invention to be described also differs from the first embodiment in, e.g., the developing system of the developing unit 5. As shown in FIG. 8, the developing unit 5 includes a hopper 31, an agitator 32, a feed roller 33, a doctor blade 34 and a developing sleeve 35 and uses a contact one-ingredient type developing system.

In the illustrative embodiment, the feed roller 33 is formed of a foam material. Nonmagnetic toner t being conveyed by the surface of the feed roller 33 is rubbed against the roller 33 and frictionally charged thereby. The charged toner t is transferred from the feed roller 33 to the developing sleeve 35. The developing sleeve 35 has a surface implemented by urethane rubber or similar elastic material. The developing sleeve 35 contacts the drum 2 with a DC bias power source 36 applying a DC bias between the sleeve 35 and the drum 2, thereby developing a latent image. This kind of development is characterized in that the toner t is transferred from the sleeve 35 to the drum 2 in the same manner as in offset printing and therefore deposits on both of an area image and a dot image in substantially the same condition. As also shown in FIG. 4 (Contact 1-Ingredient (Nonmagnetic)), this embodiment stably forms a dot of 50 µm or below while preventing an excessive amount of toner from depositing on the dot. This is because the illustrative embodiment limits the amount of toner to be fed to the drum 2 and causes a thin toner layer to directly contact the surface of the drum 2.

Fourth Embodiment

Figure 9:
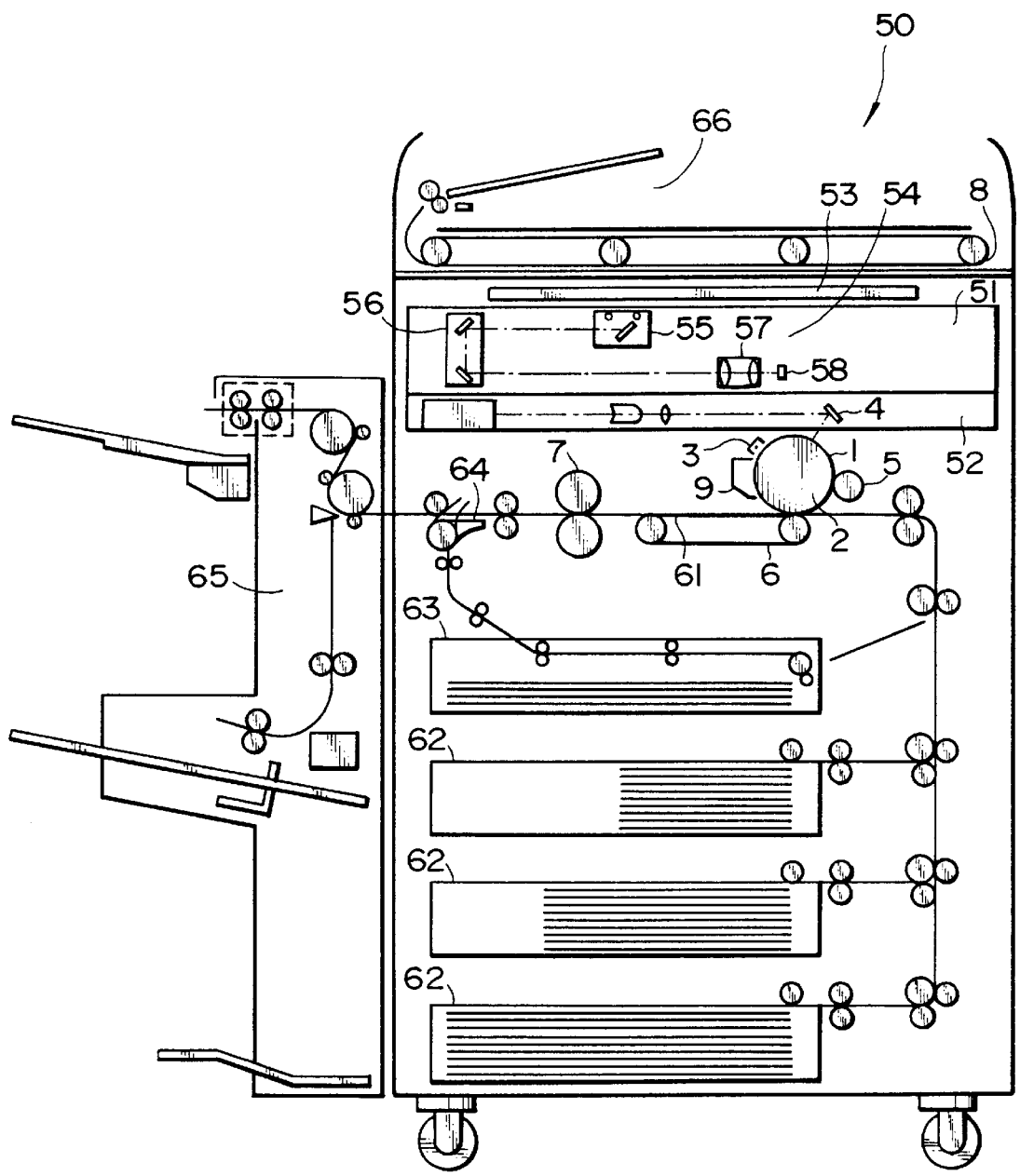
FIG. 9 is a vertical section showing a fourth embodiment of the present invention.

FIG. 9 shows a fourth embodiment of the present invention implemented as a digital copier. As shown, the digital copier, generally 50, is mainly made up of an image reading unit 51 and an image forming unit 52 implemented by any one of the first to third embodiments.

The image reading unit 51 optically reads a document, not shown, laid on a glass platen 53 with scanning optics 54. The scanning optics 54 includes a first carriage 55 including a lamp and a mirror and facing the glass platen 53. The first carriage 55 is movable in the subscanning direction. A movable second carriage 56 faces the first carriage 55 and includes mirrors. A CCD (Charge Coupled Device) image sensor 58 faces the second carriage 56 with the intermediary of a lens 57. A stepping motor, not shown, is drivably connected to the two carriages 55 and 56 via pulleys and wires. The stepping motor drives the carriage 55 at a speed two times higher than the speed of the carriage 56 in the subscanning direction so as not to vary the length of an optical path.

The image forming unit 52 prints image data output from the image reading unit 51 on a paper or similar recording medium, not shown, and includes the image forming apparatus 1. A plurality of paper feeding mechanisms 62 are positioned upstream of a paper transport path 61 in the direction of paper conveyance, and each is loaded with a stack of papers of particular size in a particular orientation. A paper feed unit 63 is positioned above the paper feed mechanisms 62 and assigned to a duplex copy mode for forming images on both sides of a paper. The paper feed unit 63 is communicated to the paper transport path 61 at its paper refeed side. A paper discharge mechanism 64 is arranged downstream of the paper transport path 61 in the direction of paper conveyance. Further, a finisher is positioned downstream of the paper discharge mechanism 64 for sorting or stacking papers, or printings, sequentially driven out of the image forming unit 52.

An ADF (Automatic Document Feeder) 66 is mounted on the top of the copier 50 for automatically feeding documents to the image reading unit 51 one by one. An operation panel, not shown, is mounted on the top front portion of the copier 50.

The copier 50 implemented with any one of the first to third embodiments achieves the same advantages as the embodiment.

Fifth Embodiment

Figure 10:
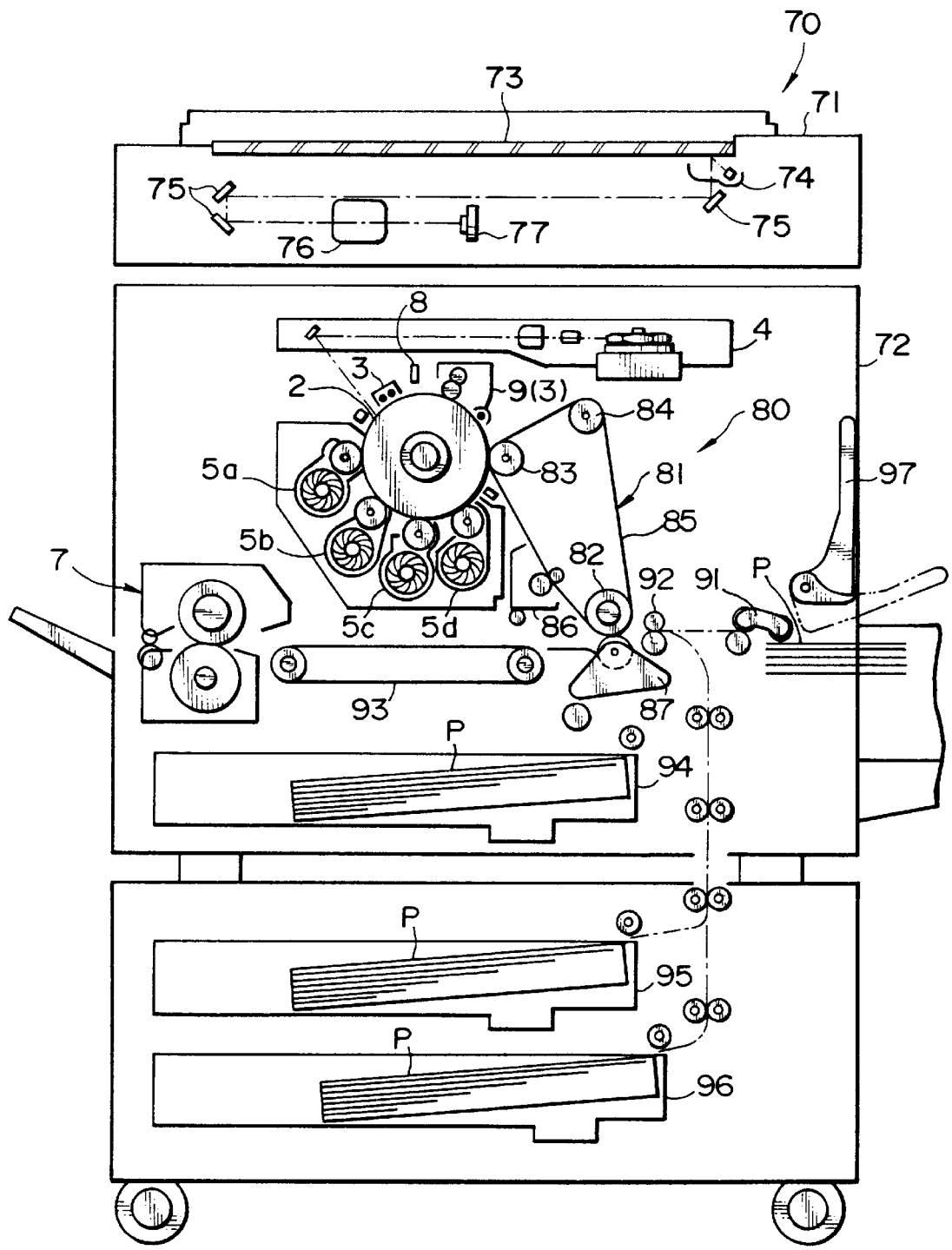
FIG. 10 is a vertical section showing a fifth embodiment of the present invention.

A fifth embodiment of the present invention is shown in FIG. 10 and implemented as a digital color copier 70. As shown, the digital color copier 70 is generally made up of an image reading unit 71 and an image forming unit 72. The image reading unit 71 focuses the image of a document 73 on a color image sensor 77 by use of a lamp 64, mirrors 75 and a lens 76. The color image sensor 77 reads image data representative of the document 73 and separated into three primary colors R (red), G (green) and B (blue) while outputting corresponding color-by-color image signals. An image processing section, not shown, transforms the R, G and B image signals to black (Bk), cyan (C), magenta (M) and yellow (Y) color image data.

The image forming unit 72 includes an image forming apparatus 80. The image forming apparatus 80 sequentially forms toner images represented by the above color image data one upon the other and thereby produces a four-color or full-color image. A Bk developing unit 5a, a C developing unit 5b, an M developing unit 5c and a Y developing unit 5d respectively store Bk toner, C toner, M toner and Y toner, and each are identical in configuration with the developing unit 5 of any one of the first to third embodiments. The image forming apparatus 80 is therefore identical with the image forming apparatus 1 except that it is capable of forming color images. Namely, the drum 2 includes a photoconductive film having a thickness of 15 µm or below. The optics or exposing unit 4 forms a latent image in the form of dots on the drum 2 by selectively turning on or turning off a light beam having a diameter of 50 µm or below in terms of the $1/e^2$ diameter. The light beam is intense enough to sufficiently attenuate the potential of the drum 2. Further, the apparatus 80 renders tonality on the basis of the density of dots for a unit area of a toner image; toner deposits on a single latent image representative of a dot in an amount 1.2 times greater than the amount of toner to deposit on an area image for a given density and a given unit area.

An intermediate transfer belt unit 81 includes a drive roller 82, a transfer bias roller 83, a group of driven rollers 84, and an intermediate transfer belt 85 passed over the rollers 82–84. A toner image is transferred from the drum 2 to the intermediate transfer belt 85 (primary transfer). A belt cleaning unit 86 removes toner left on the belt 85 after the primary transfer. A secondary transfer unit 87 transfers a composite toner image from the belt 85 to a paper or similar recording medium P (secondary transfer). The intermediate belt unit 81 and secondary transfer unit 87 constitute a transferring device of the illustrative embodiment.

On the start of operation of the above copier 70, the image reading unit 71 starts reading Bk image data out of a document at a preselected timing. A laser beam scans the surface of the drum 2 in accordance with the image data for thereby forming a Bk latent image on the drum 2. The Bk latent image is developed by the Bk toner. The resulting Bk toner image is transferred from the drum 2 to the intermediate transfer belt 85 moving at the same speed as the drum 2. For the primary transfer, a preselected bias is applied to the transfer bias roller 83 when the drum 2 and belt 85 are held in contact with each other.

A C, an M and a Y toner image are sequentially formed on the drum 2 in the same manner as the Bk toner image. It is to be noted that the order of Bk, C, M and Y shown and described is only illustrative. The C, M and Y toner images are sequentially transferred from the drum 2 to the belt 85 one upon the other in accurate register, completing a full-color image. The secondary transfer unit 87 transfers the full-color image from the belt 85 to the paper P.

A pickup roller 91 and a registration roller pair 92 feed one paper P to the secondary transfer unit 87 at such a timing that the leading edge of the paper P meets the leading edge of the full-color image formed on the belt 85. A paper conveying unit 93 conveys the paper or printing P carrying the full-color image thereon to the fixing unit 7. Paper cassettes 94, 95 and 96 each are loaded with a stack of papers P of particular size. When a desired paper size is input on an operation panel, not shown, the papers P of the desired size are sequentially fed toward the registration roller pair 92. A manual feed tray 97 is available for feeding OHP (OverHead Projector) sheets or thick sheets by hand.

While the above description has concentrated on a full-color copy mode, a three-color or a two-color copy mode is, of course, practicable by repeating the above procedure a number of times corresponding to the number of desired colors and the number of desired copies. In a single color copy mode, only one developing unit storing toner of designated color is continuously operated until a desired number of copies have been output. At this instant, the belt 85 is continuously moved forward at a constant speed in contact with the drum 2. Also, the belt cleaning unit 86 is continuously held in contact with the belt 85.

The above copier 70 includes the image forming apparatus 80 identical with the image forming apparatus 1 except that it forms color images. The copier 70 therefore achieves the same advantages as any one of the previous embodiments.

As stated above, in the first to fifth embodiments, a photoconductive element includes a photoconductive film having a thickness of 15 μm or below. A light beam having a diameter of 50 μm or below optically forms a latent image on the photoconductive element. Toner is caused to deposit on a dot image in an amount 1.2 times greater than on an area image. This is successful to minimize the variation of image quality and to render dots inconspicuous.

Sixth Embodiment

Figure 11:
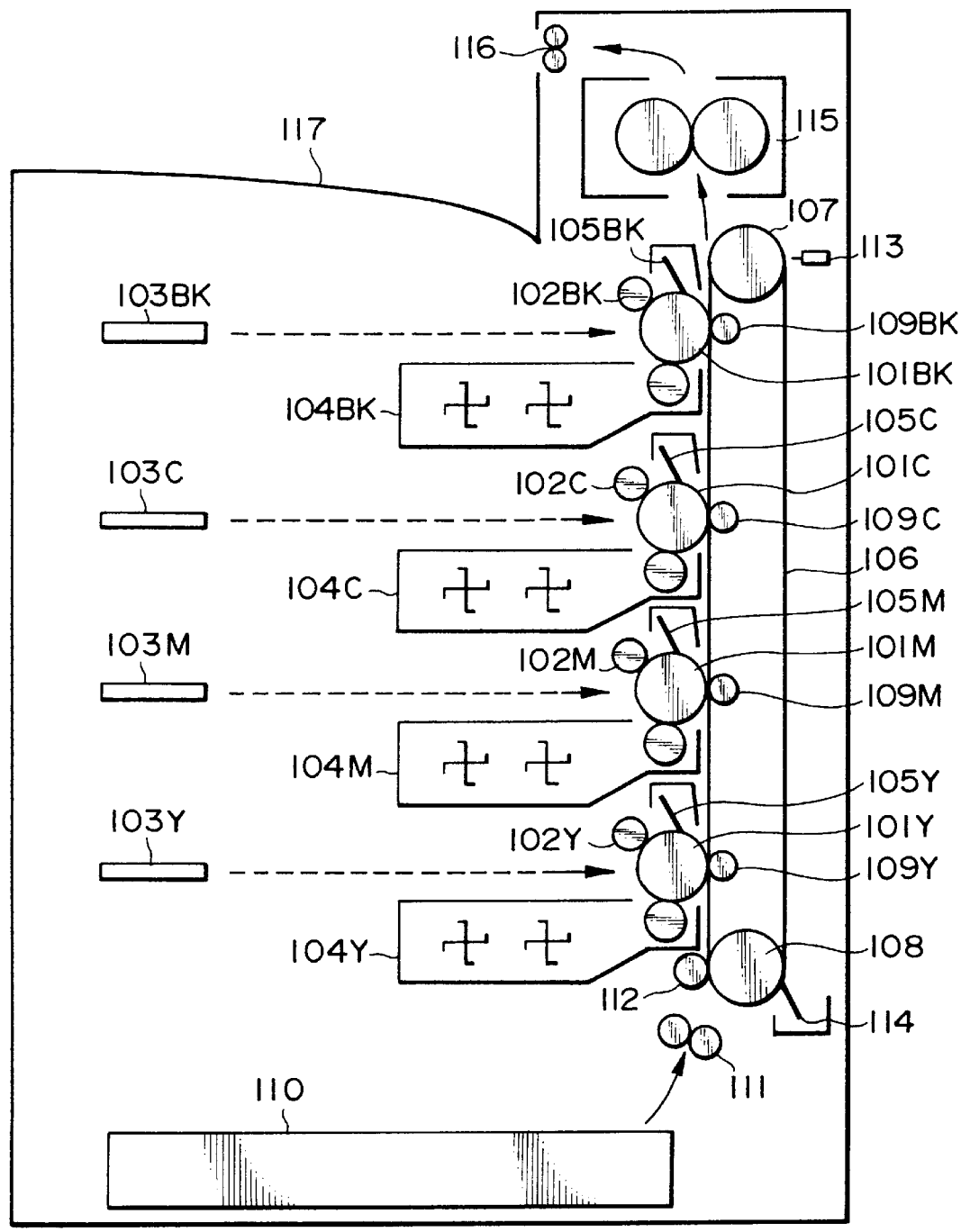
FIG. 11 is a front view showing a sixth embodiment of the present invention in a condition for effecting a full-color mode.
Figure 12:
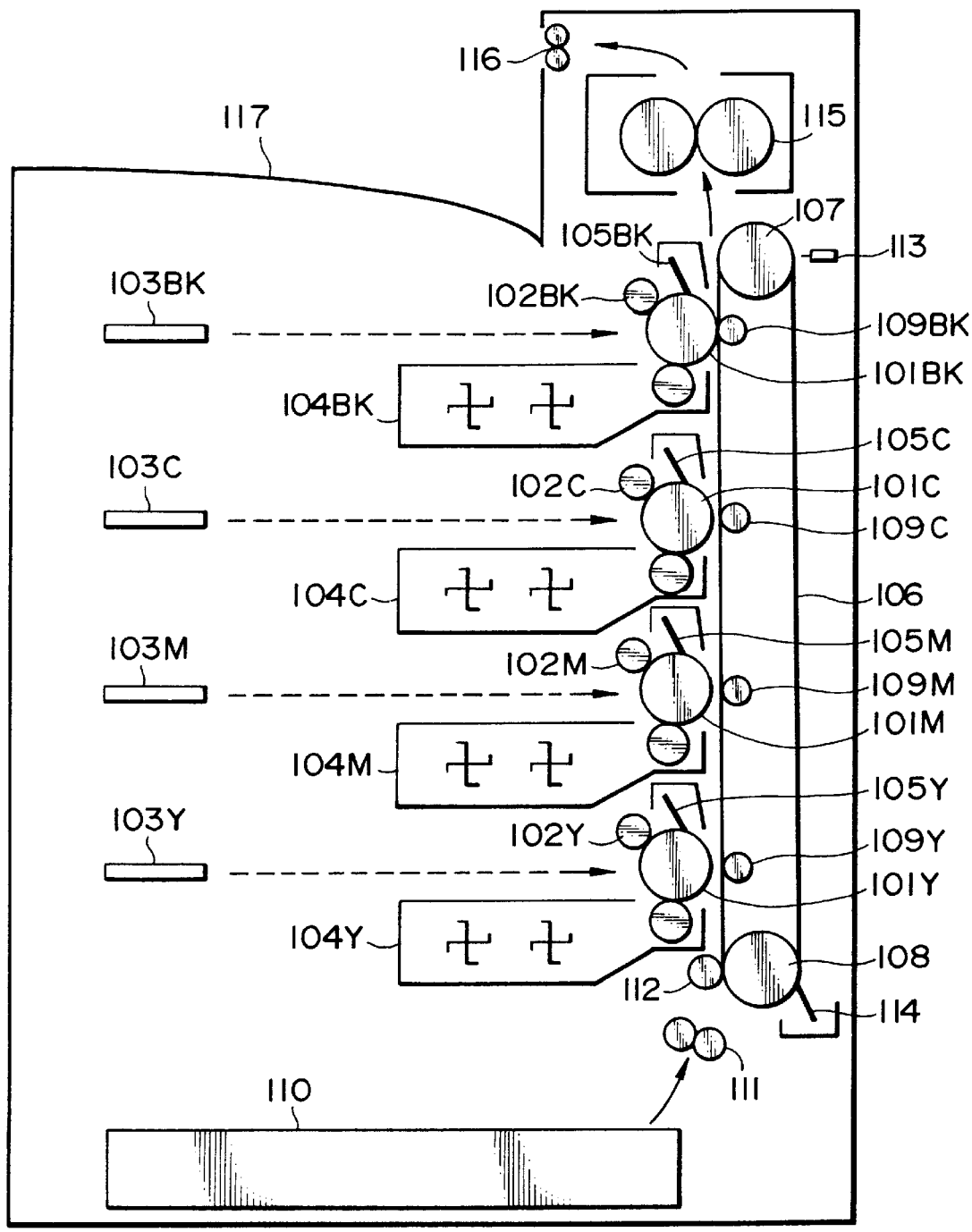
FIG. 12 is a front view similar to FIG. 11, showing a condition for effecting a black-and-white mode.

Reference will be made to FIGS. 11 and 12 for describing a sixth embodiment of the present invention which is implemented as a tandem full-color printer using Y toner, M toner, C toner, and Bk toner. As shown, image forming sections each assigned to a particular color are arranged one above the other and include photoconductive drums 101Y, 101M, 101C and 101Bk, respectively. Charging means 102Y, an exposing position defined by exposing means 103Y, developing means 104Y and a cleaning unit 105Y are sequentially arranged around the drum 101Y for implementing an electrophotographic process. Such charging means, exposing position, developing means and cleaning unit are also arranged around each of the other drums 101M, 101C and 101Bk and distinguished by the suffixes M, C and Bk. A belt 106 is passed over a drive roller 107 and a driven roller 108 and plays the role of a support member for supporting a paper or similar recording medium. The belt 106 extends vertically and movable toward and away from the transfer positions of the drums 101Y, 101M, 101C and 101Bk aligning in the vertical direction. Transferring means 109Y, 109M, 109C and 109Bk respectively face the drums 101Y, 101M, 101C and 101Bk with the intermediary of one vertical run of the belt 106.

A registration roller pair 111 and retaining means 112 are arranged below the belt 106. A paper, not shown, is fed from a paper cassette 110 toward the registration roller pair 111 and retained on the belt 106 by the retaining means 112. Discharging means 113 and cleaning means 114 are associated with the belt 106. Fixing means 115, an outlet roller pair 116 and a tray 117 are sequentially arranged in this order in the vicinity of the upper or outlet end of the belt 106.

In a full-color mode, the charging means 102Y–102Bk (collectively 102 hereinafter) each uniformly charge the surface of associated one of the drums 101Y–101Bk (collectively 101 hereinafter). The exposing means 103Y–103Bk (collectively 103 hereinafter) each emit light beams in the form of dots toward the charged surface of the drum 102 in accordance with a color-by-color image signal, thereby forming a latent image on the drum 102. The developing means 104Y–104Bk (collectively 104 hereinafter) each develop the latent image formed on the associated drum 102 with the respective toner to thereby form a toner image. The belt 106 is caused to run by the drive roller 107. The registration roller pair 111 feeds a paper received from the paper cassette 110 toward the belt 106 in synchronism with the operation of the image forming section. The belt 106 conveys the paper while the retaining means 112 causes the paper to be electrostatically retained on the belt 106. The transferring means 109Y–109Bk (collectively 109 hereinafter), contacting the inner surface of the belt 106, each transfer the toner image from the associated drum 101 to the paper. As a result, toner images of different colors are sequentially transferred from the drums 101 to the paper one upon the other, forming a single full-color image. The paper with the full-color image is separated from the belt 106 by separating means or by a curvature. The fixing means 115 fixes the image on the paper with heat and pressure. The paper or full-color printing coming out of the fixing means 115 is driven out to the tray 117 by the outlet roller pair 116. After the separation of the paper from the belt 106, the discharging means 113 discharges the belt 106, and then the cleaning means 114 removes paper dust and toner from the surface of the belt 106 so as to prepare the belt 106 for the next image formation.

A black-and-white mode available with the illustrative embodiment will be described with reference to FIG. 12. As shown, in the black-and-white mode, the belt 106 is spaced from the drums 101Y, 101M and 101C by mode switching means not shown. The image forming sections other than one assigned to black are not operated. This prevents the drums 101Y, 101M and 101C and color developers from being deteriorated during black-and-white mode operation. The paper fed from the registration roller pair 111 is electrostatically retained on the belt 106 by the retaining means 112. The paper can therefore be surely conveyed to the image transfer position of the drum 101Bk despite that the belt 106 is spaced from the drums 101Y, 101M and 101C.

To surely convey the paper in the above, it is necessary to continuously exert a sufficient electrostatic retaining force on the paper until the paper reaches the image transfer position of the drum 101Bk via the retainment start position. For this purpose, the belt 106 should have a high resistance. However, an excessively high resistance would result in the need for an extremely high voltage for sufficient image transfer and would bring about abnormal discharge and therefore defective images. In light of this, the belt 106 should preferably have a resistance ranging from $10^{12}$ Ω.cm to $10^{16}$ Ω.cm. To implement the belt 106 having such a resistance, use may be made of PET (polyethylene terephthalate), PVDF (polyvinyl idene fluoride), PI (polyimide), PC (polycarbonate) or similar resin with or without carbon dispersed therein for resistance adjustment. A plurality of films formed of such resin may be joined together, or the resin may be molded in the form of a seamless belt. The thickness of the belt 106 should preferably range from 50 μm to 200 μm; an excessively small thickness would reduce the strength of the belt 106 while an excessively great thickness would increase the required voltage for image transfer.

Figure 14:
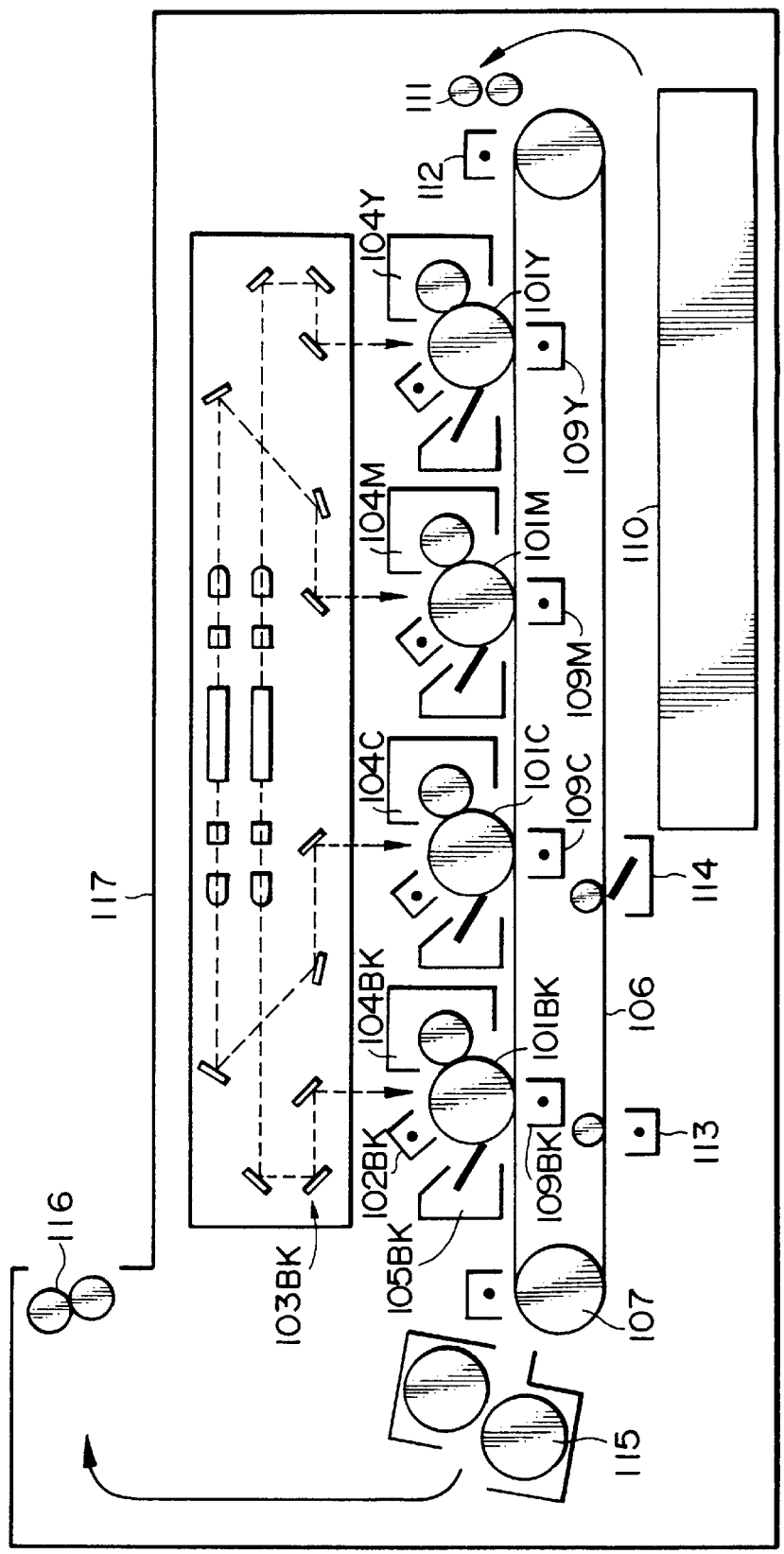
FIG. 14 is a front view showing a conventional tandem full-color printer.

The tandem full-color printer having the above construction is capable of outputting a full-color image at a far higher speed than a full-color image forming apparatus including only one photoconductive element. In a tandem full-color printer having photoconductive elements arranged horizontally, the length of a paper transport path and therefore a first print time cannot be reduced unless a paper feed tray and a printing tray are caused to protrude from the printer sideways, increasing the area to be occupied by the printer. As shown in FIG. 14 (using the same reference numerals as FIG. 11), to reduce the area to be occupied by the printer, a paper must be conveyed from the paper feed tray 110 to the printing tray 117 along a generally S-shaped transport path. This increases the length of the transport path and therefore the first print time.

The illustrative embodiment saves space and reduces the first print time at the same time with the drums 101Y–101Bk arranged vertically one above the other. Further, by reducing the diameter of the drums 101Y–101Bk, it is possible to reduce the overall size of the printer. The diameter of the drums 101Y–101Bk should preferably be 15 mm to 35 mm. Diameters greater than 35 mm would obstruct the miniaturization of the printer while diameters smaller than 15 mm would make it difficult to arrange the charging means 102, developing means 104 and transferring means 109 around the drums 101Y–101Bk.

The drums 101Y–101Bk may be implemented by any conventional organic photoconductor (OPC). Generally, the charge potential of the drums 101Y–101Bk should be as low as possible in absolute value in order to protect the drums from deterioration due to aging. However, when the charge potential is low, conventional printers fail to implement a required image density or contaminate the background of an image due to short potential contrast.

The illustrative embodiment uses toner capable of guaranteeing a required image density with an amount smaller than conventional one, i.e., toner having a great tinting strength. This ensures a required image density despite a charge potential as low as 350 V to 550 V in absolute value and thereby causes the drums 101Y–101Bk to deteriorate little despite aging, preserving high image quality over a long period of time. The charge potential would prevent a required image density from being attained if lower than 350 V in absolute value, because the tinting strength of usable toner is limited, as will be described more specifically later. The charge potential would aggravate the deterioration of the drums 101Y–101Bk ascribable to aging if higher than 550 V.

While conventional toner must be deposited in an amount of 0.1 mg/cm$^2$ for implementing a required image density, the illustrative embodiment reduces the above amount by increasing the tinting strength of toner and therefore obviates short image density even when the charge potential is lowered. Further, assume that the amount of toner deposited on the drums 101Y–101Bk and paper increases, increasing the overall thickness of a toner layer. Then, the retainment acting on toner particles existing in an upper portion of the toner layer due to the charges of the drums 101Y–101Bk and the charge of the paper decreases. As a result, such toner particles scatter due to their own charges repulsing each other, critically degrading image quality. Therefore, reducing the amount of toner, as stated above, is also successful to obviate the scattering of the toner. This is particularly true with a full-color printer of the type transferring toner images of different colors one upon the other.

Moreover, toner with an increased tinting strength reduces the required amount of toner for a single printing and therefore implements, for a given toner container capacity, a greater number of printings than conventional toner or reduces, for a given number of printings required of a single toner container, reduces the size of the container. This successfully reduces the running cost and overall size of the printer. However, an excessively high tinting strength of toner would render even small spots on the background conspicuous. In addition, if the amount of a coloring agent contained in toner noticeably differs from one toner to another toner, then the amount of charge to deposit will noticeably differ from one toner to another toner, making a process control difficult to execute. It is therefore desirable to use toner having a tinting strength capable of guaranteeing required image density after fixation when the toner is deposited on a paper in an amount between 0.3 mg/cm$^2$ and 0.7 mg/cm$^2$.

A required image density depends on the color. A full-color image free from short image density is achievable if a black, a cyan, a magenta and a yellow solid image respectively have image densities of 1.4 or above, 1.2 or above, 1.2 or above and 1.0 or above, as measured by a reflection densitometer after fixation.

A full-color image was experimentally output by use of toner having a tinting strength implementing a required image density after fixation when deposited on a paper in an amount of 0.5 mg/cm$^2$ which is the medium value of the above range. Toner forming the above image was free from noticeable scattering even when the image was a line image. Japanese Patent Laid-Open Publication No. 9-54472 mentioned earlier describes that when the tinting strength of yellow toner Y, magenta toner M and cyan toner C and the tinting strength of black toner Bk are different from each other, excel lent color balance and color reproducibility are achievable. The illustrative embodiment makes it needless to provide each of the color toner and black toner with a particular tinting strength because of its tandem arrangement.

The particle size of toner also has critical influence on image quality and service life. An excessively great particle size would obstruct faithful reproduction of an image and would render a toner image rough. An excessively small particle size tends to increases the amount of charge for a unit mass to an excessive degree and is apt to lower image density due to short development. In light of this, a weight average particle size should preferably be control led to 4.5 μm to 8.5 μm. So long as toner satisfies the above range of tinting strengths and the range of particle sizes, the developing means 4 may use either one of one-ingredient development and two-ingredient development. Japanese Patent Laid-Open Publication No. 10-83120, for example, discloses an image forming method capable of implementing desirable image density with low potential contrast and a developer feasible for the method. The developer taught in this document is applicable to the illustrative embodiment if its composition is so adjusted to confine the tinting strength and particle size in the above specific ranges.

When tonality is rendered by the error scattering method, dither method or similar area tonality method, solitary dots formed on a paper are conspicuous and lower image quality if their diameter is great. It was experimentally found that dots having a diameter of 50 μm or below were inconspicuous in an image. Theoretically, image quality increases with a decrease in the diameter of a solitary dot. In practice, however, because toner particles have a size of the order of several microns, experiments using toner having a weight average particle size of 7.5 μm failed to stably form dots having a diameter of 30 μm or below. Presumably, as the toner particles decrease, the size of dots which can be stably formed also decreases. Therefore, considering the use of toner having a weight average particle size of 4.5 μm to 8.5 μm, it is possible to stably form solitary dots if each solitary dot has a diameter of 25 μm to 50 μm when fixed.

We described the following finding in Japanese Patent Laid-Open Publication No. 10-138566 mentioned earlier. Namely, stable solitary dots and sufficient image density both are achievable if the following relations hold:

$$4I_0 \leq I \text{ and } 0.25 \leq D \leq 0.75$$

preferably $$3I_0 < I \times D < 5I_0$$

where $I_0$, $I$ and $D$ respectively denote an amount of exposure attenuating a charge potential to ½, an amount of exposure of exposing means, and an exposure duty for a single pixel. This condition, coupled with the adequate tinting strength and particle size of toner unique to the illustrative embodiment, will further enhance stable image quality.

Figure 13:
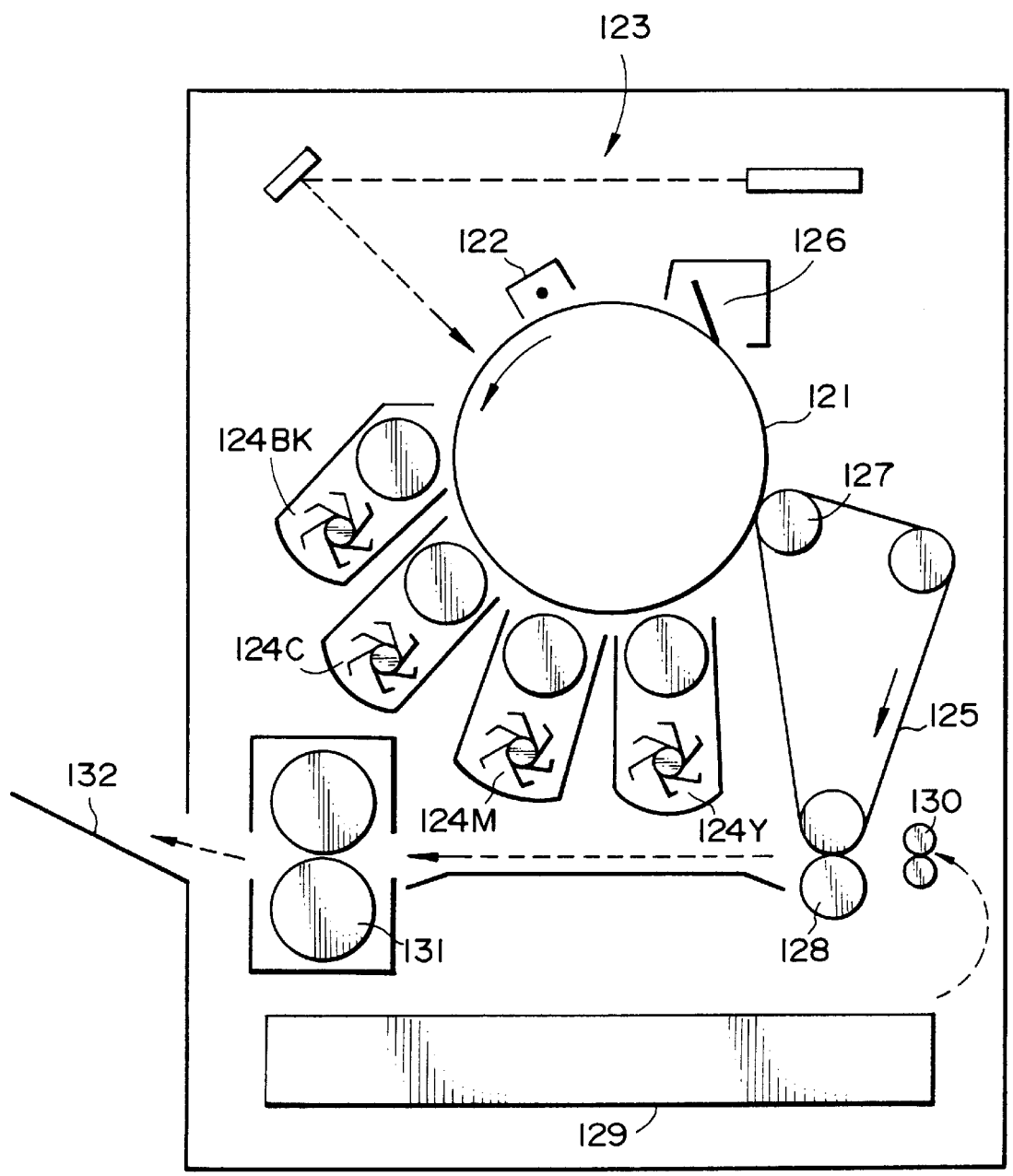
FIG. 13 is a front view showing a modification of the sixth embodiment.

The illustrative embodiment is applicable not only to the tandem full-color printer shown in FIG. 11, but also to a full-color printer shown in FIG. 13 and using an intermediate transfer member. The crux is that a charge potential, properties of toner and so forth satisfy the previously stated conditions.

As shown in FIG. 13, the color printer includes a single photoconductive drum 121. Charging means 122, an exposing position defined by exposing means 123, developing means 124Bk, 124C, 124M and 124Y each assigned to a particular color, an intermediate transfer belt (simply belt hereinafter) 125 and cleaning means 126 are sequentially arranged around the drum 121 in this order in order to implement an electrophotographic process. The developing means 124Bk–124Y are controllable independently of each other, and only one of them is operated for each color. A toner image formed on the drum 121 is transferred to the belt 125 by first transferring means 127 positioned between the opposite runs of the belt 125. The transferring means 127 is movable into and out of contact with the drum 121 with the intermediary of the belt 125. The transferring means 127 is brought into contact with the drum 121 only during image transfer. After toner images of different colors have been sequentially transferred to the belt 125 one upon the other to form a full-color image, second image transferring means 128 transfers the full-color toner image to a paper or similar recording medium. The paper is fed from a paper cassette 129 via a registration roller pair 130 at a preselected timing. The fixing means 131 fixes the toner image on the paper. The resulting full-color printing is driven out to the tray 132. The second transferring means 128, like the first transferring means 127, is brought into contact with the belt 125 only at the time of image transfer.

A full-color printer using an image transfer drum sequentially transfers toner images of different colors to a paper electrostatically wrapped around the transfer drum and cannot deal with thick papers. By contrast, the printer shown in FIG. 13 is operable with any kind of papers because it transfers toner images of different colors to the belt or intermediate transfer body 125. The tandem printer is, of course, capable of dealing with various kinds of papers because it conveys a paper linearly along the drums.

As stated above, the illustrative embodiment causes charging means to deposit a relatively low charge potential on a photoconductive element and uses toner having a great tinting strength, thereby implementing required image density after fixation. This is successful to minimize the electrostatic fatigue of the photoconductive element and to stably form high quality images free from roughness. Further, the illustrative embodiment is capable of forming stable solitary dots, ensuring a sufficient image density, realizing a small size, space saving configuration, and outputting high quality, full-color images with high productivity.

Various modifications will become possible for those skilled in the art after receiving the teachings of the present disclosure without departing from the scope thereof.

What is claimed is:

1. An image forming apparatus comprising:
    a photoconductive element including a photoconductive film having a thickness of 15 μm or below;
    an exposing device for forming an electrostatic latent image in a form of dots on said photoconductive element by selectively turning on or turning off a light beam having a beam diameter of 50 μm or below in terms of a $1/e^2$ diameter and intense enough to sufficiently attenuate a potential deposited on said photoconductive element; and
    a developing device for developing the latent image with a dry developer to thereby form a corresponding toner image;
    wherein tonality is rendered on the basis of a density of the dots for a unit area, and wherein the toner deposits on the dots in an amount 1.2 times greater than an amount to deposit on an area image for a given uniform density and a given unit area.

2. An apparatus as claimed in claim 1, wherein said developing device uses a two-ingredient type developer allowing a charge to deposit on the toner thereof in an amount of 20 μC/gr or above for a unit weight of the toner.

3. An apparatus as claimed in claim 1, wherein said developing device uses a one-ingredient type developer depositing on a developing sleeve in an amount substantially equal to an amount necessary for an area image.

4. An apparatus as claimed in claim 1, wherein said developing device uses a one-ingredient type developer and a contact type developing system using a DC bias.

5. An apparatus as claimed in claim 1, wherein said exposing device has an optical writing density of 600 dpi (dots per inch) or above for the latent image in the form of dots.

6. A copier comprising:

an image reading device for reading a document; and an image forming apparatus for electrophotographically forming an image read by said image reading means;

said image forming apparatus comprising:

a photoconductive element including a photoconductive film having a thickness of 15 μm or below;

an exposing device for forming an electrostatic latent image in a form of dots on said photoconductive element by selectively turning on or turning off a light beam having a beam diameter of 50 μm or below in terms of a $1/e^2$ diameter and intense enough to sufficiently attenuate a potential deposited on said photoconductive element; and a developing device for developing the latent image with a dry developer to thereby form a corresponding toner image;

wherein tonality is rendered on the basis of a density of the dots for a unit area, and wherein the toner deposits on the dots in an amount 1.2 times greater than an amount to deposit on an area image for a given uniform density and a given unit area.

7. A copier as claimed in claim 6, wherein said developing device uses a two-ingredient type developer allowing a charge to deposit on the toner thereof in an amount of 20 μC/gr or above for a unit weight of the toner.

8. A copier as claimed in claim 6, wherein said developing device uses a one-ingredient type developer depositing on a developing sleeve in an amount substantially equal to an amount necessary for an area image.

9. A copier as claimed in claim 6, wherein said developing device uses a one-ingredient type developer and a contact type developing system using a DC bias.

10. A copier as claimed in claim 6, wherein said exposing device has an optical writing density of 600 dpi or above for the latent image in the form of dots.

11. A copier comprising:

an image reading device for reading a document; and an image forming apparatus for electrophotographically forming a color image read by said image reading device;

said image forming apparatus comprising:

a photoconductive element including a photoconductive film having a thickness of 15 μm or below;

an exposing device for forming, color by color, an electrostatic latent image in a form of dots on said photoconductive element by selectively turning on or turning off a light beam having a beam diameter of 50 μm or below in terms of a $1/e^2$ diameter and intense enough to sufficiently attenuate a potential deposited on said photoconductive element; and a plurality of developing devices each for developing a particular electrostatic latent image with a dry developer of particular to thereby produce a corresponding toner image; and a transferring device for transferring toner images of different colors produced by said plurality of developing devices to a recording medium one upon the other to thereby form a composite color image;

wherein tonality is rendered on the basis of a density of the dots for a unit area, and wherein the toner deposits on the dots in an amount 1.2 times greater than an amount to deposit on an area image for a given uniform density and a given unit area.

12. A copier as claimed in claim 11, wherein said plurality of developing devices each use a two-ingredient type developer allowing a charge to deposit on the toner thereof in an amount of 20 μC/gr or above for a unit weight of the toner.

13. A copier as claimed in claim 11, wherein said plurality of developing devices each use a one-ingredient type developer depositing on a developing sleeve in an amount substantially equal to an amount necessary for an area image.

14. A copier as claimed in claim 11, wherein said plurality of developing device each use a one-ingredient type developer and a contact type developing system using a DC bias.

15. A copier as claimed in claim 11, wherein said exposing device has an optical writing density of 600 dpi or above for the latent image in the form of dots.

16. An electrophotographic image forming method comprising the steps of:

an exposing step for forming on a photoconductive element including a photoconductive film having a thickness of 15 μm or below an electrostatic latent image in a form of dots by selectively turning on or turning off a light beam having a beam diameter of 50 μm or below in terms of a $1/e^2$ diameter and intense enough to sufficiently attenuate a potential deposited on said photoconductive element; and a developing step for developing the latent image with a dry developer to thereby form a corresponding toner image;

wherein tonality is rendered on the basis of a density of the dots for a unit area, and wherein the toner deposits on the dots in an amount 1.2 times greater than an amount to deposit on an area image for a given uniform density and a given unit area.

17. A method as claimed in claim 16, wherein said developing step uses a two-ingredient type developer allowing a charge to deposit on the toner thereof in an amount of 20 μC/gr or above for a unit weight of the toner.

18. A method as claimed in claim 16 wherein said developing step uses a one-ingredient type developer depositing on a developing sleeve in an amount substantially equal to an amount necessary for an area image.

19. A method as claimed in claim 16, wherein said developing step uses a one-ingredient type developer and a contact type developing system using a DC bias.

20. A method as claimed in claim 16, wherein said exposing step uses an optical writing density of 600 dpi or above for the latent image in the form of dots.

21. An image forming apparatus comprising:

a photoconductive element;

charging means for uniformly charging a surface of said photoconductive element;

exposing means for exposing the charged surface of said photoconductive element in a form of dots to thereby form an electrostatic latent image;

developing means for developing the latent image to thereby produce a corresponding toner image;

transferring means for transferring the toner image from said photoconductive element to a recording medium; and fixing means for fixing the toner image on the recording medium;

wherein said charging means deposits a charge potential of 350 V to 550 V in absolute value on said photoconductive element, and wherein use is made of toner having a tinting strength which causes said toner to deposit on the paper in an amount of 0.3 mg/cm$^2$ to 0.7 mg/cm$^2$ when measured after fixation.

22. An apparatus as claimed in claim 21, wherein the toner has a weight average particle size of 4.5 μm to 8.5 μm and forms solitary dots having a mean diameter of 25 μm to 50 μm on the recording medium when measured after fixation.

23. An apparatus as claimed in claim 21, wherein assuming that an amount of exposure for attenuating the charge potential of said photoconductive element to ½ is $I_0$, that said exposing means exposes said photoconductive element by an amount I, that a pulse width for modulating a light source included in said exposing means is Δt, and that a period of time necessary for scanning a dot pitch is T, an exposure duty D for a single pixel represented by D=Δt/T satisfies relations:

$$4I_0 \leq I \text{ and } 0.25 \leq D \leq 0.75.$$

24. An apparatus as claimed in claim 21, wherein assuming that an amount of exposure for attenuating the charge potential of said photoconductive element to ½ is $I_0$, that said exposing means exposes said photoconductive element by an amount I, that a pulse width for modulating a light source included in said exposing means is Δt, and that a period of time necessary for scanning a dot pitch is T, an exposure duty D for a single pixel represented by D=Δt/T satisfies a relation:

$$3I_0 < I \times D < 5I_0.$$

25. An apparatus as claimed in claim 21, wherein said apparatus comprises a full-color image forming apparatus using a plurality of toners different in color from each other and a plurality of developing means each storing one of the plurality of toners, and sequentially transfers toner images of different colors to the recording medium one upon the other and causes said fixing means to fix a resulting full-color image.

26. An apparatus as claimed in claim 25, wherein said apparatus comprises a full-color image forming apparatus comprising:

an intermediate transfer body;

first transferring means for transferring the toner image from said photoconductive element to said intermediate transfer body; and second transferring means for transferring the full-color image to the recording medium;

wherein after the toner images of different colors have been sequentially transferred to said intermediate transfer body one upon the other, said second transferring means transfers the resulting full-color image to the recording medium.

27. An apparatus as claimed in claim 25, wherein said apparatus comprises a tandem full-color image forming apparatus comprising:

a plurality of photoconductive elements arranged vertically one above the other and each having a diameter of 15 mm to 35 mm;

a support member for supporting the recording medium; and a plurality of transferring means each being assigned one-to-one to said plurality of photoconductive elements;

wherein said apparatus sequentially transfers toner images of different colors to the recording medium supported by said support member one upon the other to thereby form a full-color image.

* * * * *